No. 641,897. Patented Jan. 23, 1900.
F. R. SIMMS.
MOTOR DRIVEN CAR FOR USE IN WARFARE.
(Application filed Oct. 20, 1898.)
(No Model.) 5 Sheets—Sheet 3.
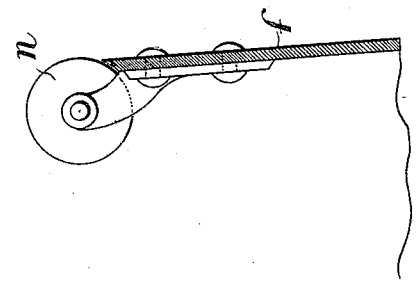
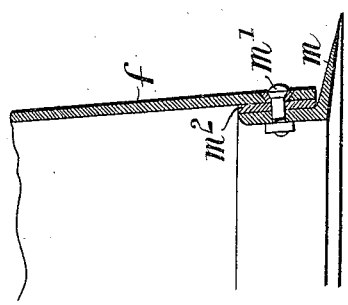
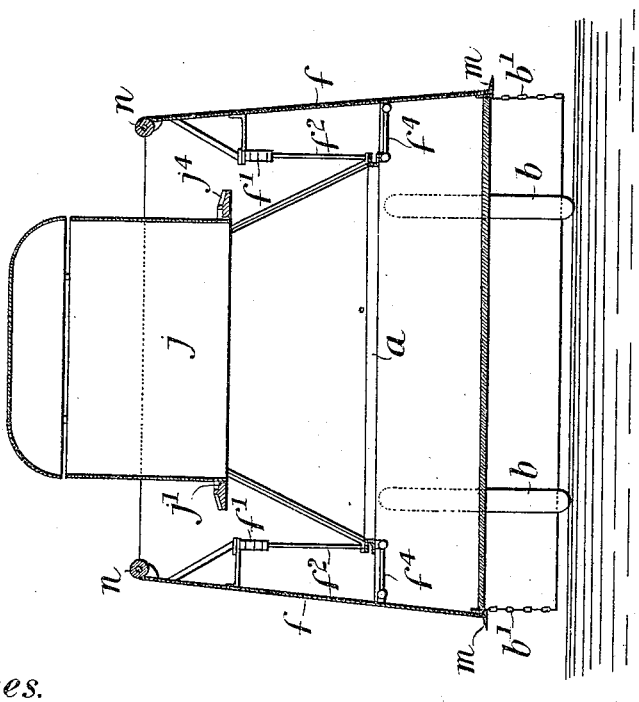
Witnesses. Inventor:
J. D. Kingsbury Frederick R. Simms
By Whitaker & Prevost attys.

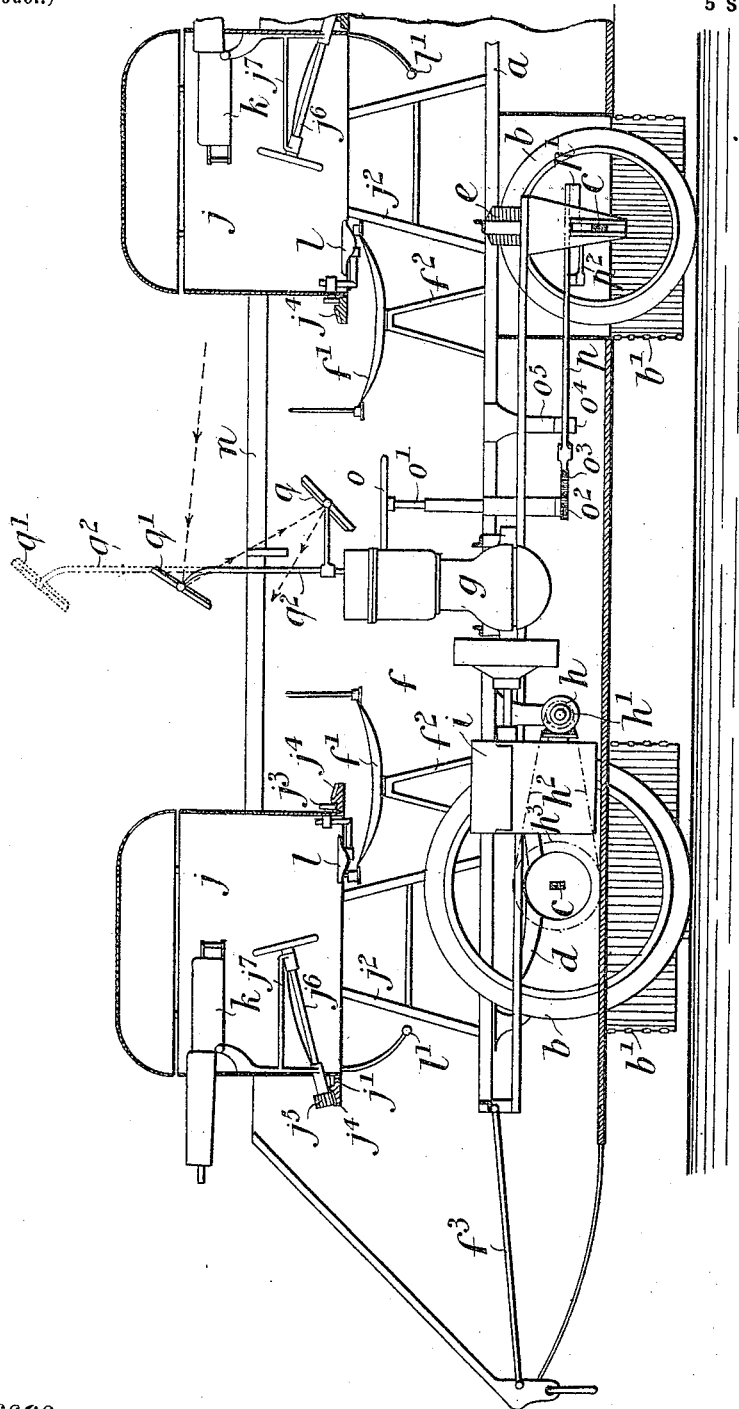

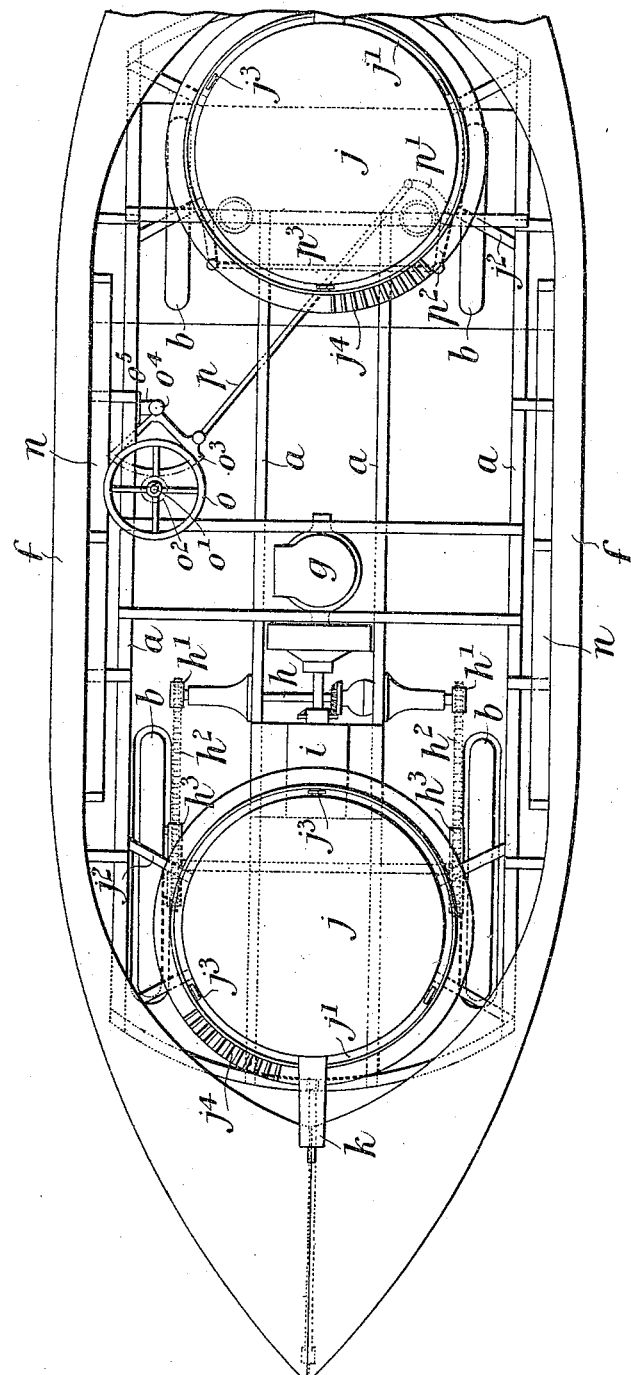

No. 641,897. Patented Jan. 23, 1900.
F. R. SIMMS.
MOTOR DRIVEN CAR FOR USE IN WARFARE.
(Application filed Oct. 20, 1898.)
(No Model.) 5 Sheets—Sheet 4.
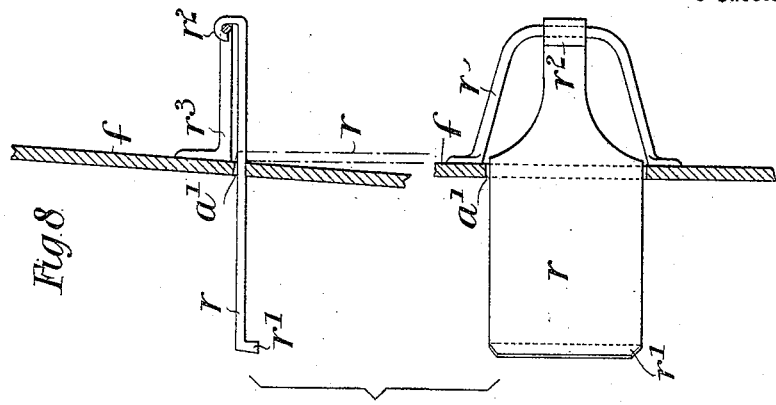
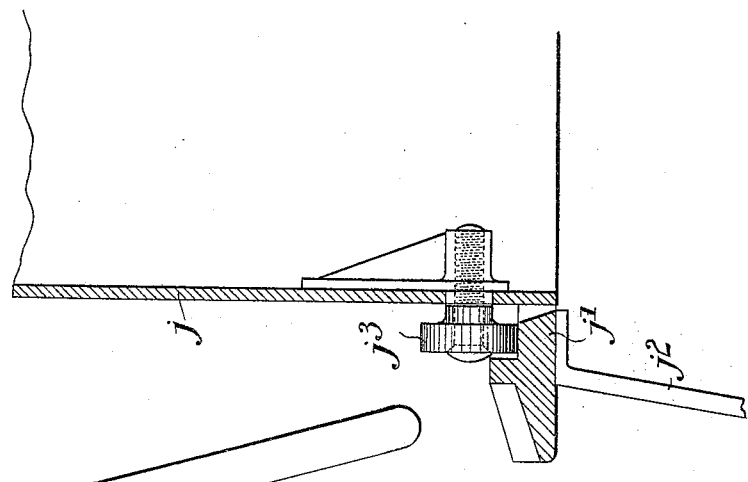
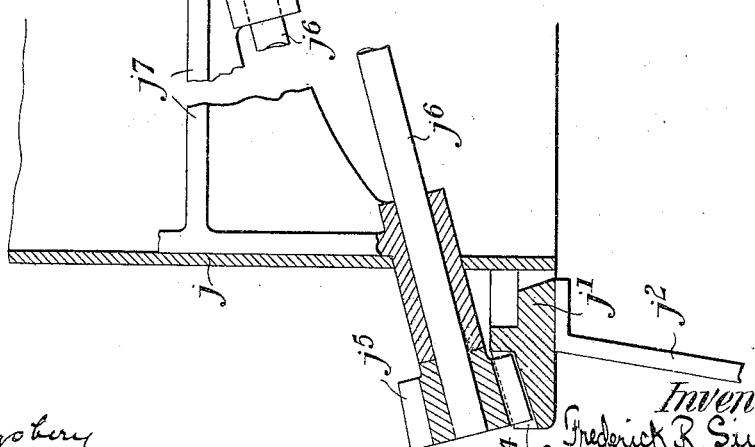
Witnesses. Inventor:

No. 641,897. Patented Jan. 23, 1900.
F. R. SIMMS.
MOTOR DRIVEN CAR FOR USE IN WARFARE.
(Application filed Oct. 20, 1898.)
(No Model.) 5 Sheets—Sheet 5.
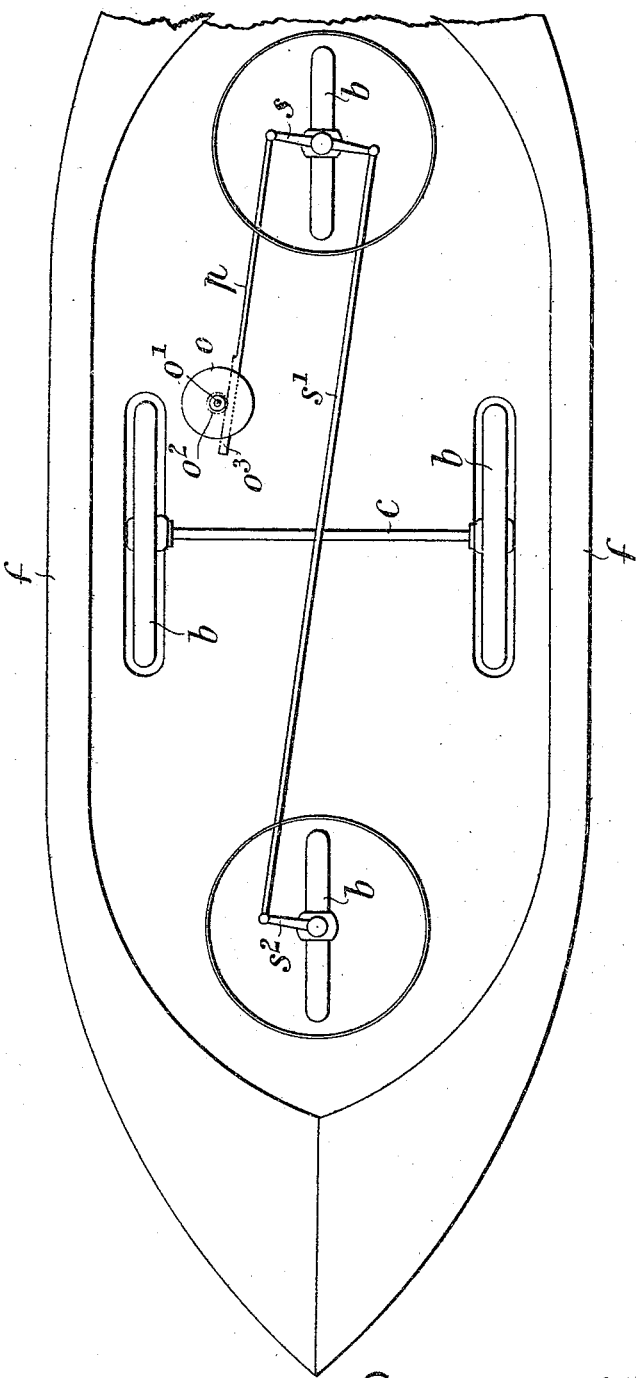
Witnesses.
J. D. Kingsbury
B. W. Brackett
Inventor.
Frederick R. Simms
By Whitaker & Prevost Attys

UNITED STATES PATENT OFFICE.

FREDERICK RICHARD SIMMS, OF LONDON, ENGLAND.

MOTOR-DRIVEN CAR FOR USE IN WARFARE.

SPECIFICATION forming part of Letters Patent No. 641,897, dated January 23, 1900.

Application filed October 20, 1898. Serial No. 694,140. (No model.)

*To all whom it may concern:*

Be it known that I, FREDERICK RICHARD SIMMS, a subject of the Queen of Great Britain, residing at London, England, have invented a new and useful Motor-Driven Car for Use in Warfare, (for which I have applied for a patent in Great Britain, No. 7,387, dated March 26, 1898,) of which the following is a specification.

This invention relates to a motor-driven car adapted for use in warfare and as a means for defense, attack, transport, or traction.

In the accompanying drawings, Figure 1 is a longitudinal sectional elevation of a war-car constructed according to the invention. Fig. 2 is a plan of the car. Fig. 3 is a cross-section thereof. Figs. 4, 5, 6, 7, and 8 are views of details drawn to a larger scale, and Fig. 9 is a plan of a slightly-modified arrangement of car.

The car is constructed of a frame $a$, preferably of channel and angle steel, the said frame $a$ being mounted upon wheels $b\,b$. In the arrangement of car illustrated in Figs. 1 to 8 the wheels $b$ are four in number and are mounted on front and rear axles $c\,c$. The frame $a$ is supported upon the driving-wheels by semi-elliptical springs $d\,d$ and upon the front or steering wheels by spiral springs $e\,e$. $f f$ are the sides of the car, the said sides being of armor-plate and detachably supported upon semi-elliptical springs $f'\,f'$, which rest upon standards $f^2\,f^2$, carried by the frame $a$. The sides are also supported by end stays $f^3\,f^3$ and lateral stays $f^4\,f^4$. By this method of fixing the armor to the frame the effect of vibration is lessened and its resistance to penetration is increased.

The car can be driven by any suitable motor; but I preferably employ a petroleum or gas engine of the Daimler type, as shown at $g$ in the drawings, the motor $g$ being arranged to rotate an intermediate shaft $h$ through the medium of variable-speed and reversing gear contained in the casing $i$. The said intermediate shaft $h$ is provided with sprocket or chain wheels $h'\,h'$, which actuate the driving-wheels $b$ of the car by means of chains $h^2\,h^2$ and chain-wheels $h^3$ in connection with the said driving-wheels $b$.

At each end of the car there is mounted a turret $j$, which is adapted to revolve upon a support, the necessary movement being imparted to the turret by any suitable mechanism. The support which I advantageously employ is shown in detail in Fig. 6 and comprises a circular race $j'$, carried by legs $j^2$. The turret $j$ is provided with a number—for example, three—of rollers $j^3$, which run upon the race $j'$. To revolve the turret, I may make use of the arrangement illustrated in detail in Fig. 7. It consists of a circular rack $j^4$, with which gears a bevel-wheel $j^5$, mounted upon a spindle $j^6$, supported in a bracket $j^7$, fixed to the turret and carrying at its inner end a hand-wheel, whereby it can be rotated so as to revolve the turret upon the circular race $j'$. In each turret there is mounted a quick-firing or other suitable gun, preferably a Maxim gun, as shown at $k$, and a seat $l$ and foot-rest $l'$ for the gunner.

The armor-plate sides $f\,f$ are preferably made of such a shape that the outside of the car is somewhat cigar-shaped, so as to form a ram at each end, as clearly shown in the drawings, and the lower edge of each side is provided with a projecting belt $m$, (shown to a larger scale in Fig. 4,) which is bolted to the lower edge of the armor-plate by bolts $m'$ and is electrically insulated therefrom by an interposed layer $m^2$ of insulating material. The belt $m$ is made to slope outwardly toward the lower edge and is preferably sharpened to a cutting edge, as shown. When required, an electric current can be sent through this insulated belt as an additional protection against molestation. Furthermore, the sides $f f$ are provided at their upper edges with half-buried rollers $n$, Fig. 5, which run around the top portion, thereby preventing a firm hold being obtained upon the car. These rollers may be spiked, if desired.

The whole control of the car is under the management of one man, preferably located in the center of the car. The car is steered by any suitable means, and in the drawings I have shown two suitable methods. In that shown in Figs. 1 and 2 the steering-wheels are controlled by means of a wheel $o$, mounted upon a spindle $o'$, having a pinion $o^2$ engaging with a toothed sector $o^3$, pivoted at $o^4$ to a bracket $o^5$, secured to the frame $a$ of the car.

A rod $p$ is hinged at one end to the toothed sector $o^3$ and at the other end to a lever $p'$, which actuates one of the steering-wheels $b$, the said wheels $b$ being carried upon the ends of the axle $c$, which ends are hinged to the said axle. To provide for both steering-wheels being operated simultaneously, the lever $p'$ is connected to an arm $p^2$, controlling the other steering-wheel $b$ by means of a link $p^3$. With this arrangement it will be obvious that by turning the hand-wheel $o$ the sector is operated and actuates the steering-wheels through the medium of the rod $p$ and arms $p'$ and $p^2$.

As the occupant of the car during an attack withdraws inside the car for the purpose of protection, I provide mirrors $q\,q'$, Fig. 1, whereby the car can be steered from the inside. The mirror $q'$ is carried upon a telescopic rod $q^2$, so that it can be raised and lowered as required, as indicated by the broken and full lines.

The wheels $b\,b$ are protected by chain mail or other similar suitable jackets $b'\,b'$, suspended from the bottom of the car.

To facilitate boarding, I may provide suitable steps—such, for example, as that shown in elevation and plan in Fig. 8, wherein the step $r$ is formed with a lip $r'$ at its outer end and a hook $r^2$ at its inner end. It is adapted to be passed through a slit $a'$ in the side $f$ of the car when required for use and is supported in this position by a bracket $r^3$, which is rigidly secured to the said side and with which the hook $r^2$ engages, as shown in full lines in the figure. When not required for use, it is withdrawn within the car and suspended by the lip $r'$, which engages in and closes the slit $a'$, as shown in broken lines.

In the car a plan of which is shown in Fig. 9 the wheels $b$ are arranged one at each end, mounted upon vertical axles, and two in the center, mounted upon a horizontal axle $c$. In this case the front and rear wheels form the steering-wheels and are controlled by a hand-wheel $o$, mounted upon a spindle $o'$, carrying a toothed pinion $o^2$, which gears with a rack $o^3$ upon the end of a rod $p$, connected to one arm of a lever $s$, mounted upon the front-wheel axle, and the other arm of which is connected by the rod $s'$ to an arm $s^2$, secured to the rear-wheel axle, so that the two steering-wheels are actuated simultaneously and to the same extent by the manipulation of the hand-wheel $o$.

Instead of driving my car directly from a petroleum or other motor it will be obvious that I can drive it indirectly through the medium of a dynamo. When the dynamo is used, a portion of the current generated by it can be employed for supplying current to searchlights or the like or for sending currents around the belt $m$ of the car in the manner above described. Where the car is driven directly from a motor, a dynamo can be employed solely for generating electricity for the purposes above mentioned.

Provision is made for storing fuel, water, ammunition, provisions, &c., and I may also provide an awning or canvas cover to form a tent for the occupants of the car when necessary.

My car, in addition to being applicable for use as a town or coast defense or as a means of attack, is also equally suitable for highroads or cross-country.

As above mentioned, the armor-plate sides of the car are detachably secured to the frame thereof, so that they can be removed in time of peace and the car used without them. Futhermore, the whole car may be made suitable for transport by adapting the various parts to be taken apart easily and rapidly and built up in an equally simple and rapid manner, as is now done in connection with steamers used on rapid tropical rivers and in like places.

Having now particularly described and ascertained the nature of my said invention and in what manner the same is to be performed, I declare that what I claim is—

1. In a war-car, the combination with the horizontal main frame, provided with vertical supports, of a casing composed of armor-plate surrounding said main frame, and springs connected to said supports and to said armor-plate whereby the weight of said casing is supported by said springs, substantially as described.

2. In a war-car, the combination with the horizontal main frame, provided with vertical supports, a casing of armor-plate surrounding said main frame, supporting-springs secured to said supports and engaging said casing, and rigid links pivotally connected to said main frame and to said casing for securing it to the main frame while permitting it a slight rising-and-falling movement with respect to the main frame, substantially as described.

3. In a war-car the combination with the main frame, of a surrounding casing of armor-plate, and a laterally-projecting flange at the lower edge of said armor-plate electrically insulated therefrom, substantially as described.

4. In a war-car, the combination with the main frame, of a surrounding casing of armor-plate, and a laterally-projecting flange secured to the lower edge of said casing and having its outer edge sharpened, substantially as described.

5. In a war-car, the combination with the main frame, and supporting-wheels therefor, of a casing of armor-plate surrounding said main frame and forming the sides of the car, and depending flexible guards surrounding the wheels, substantially as described.

6. In a war-car, the combination with the main frame, and supporting-wheels therefor, of a casing of armor-plate surrounding said main frame and forming the sides of the car and depending guards of chain armor surrounding the said wheels, substantially as described.

7. In a war-car, the combination with the main frame, of a surrounding casing of armor-plate supported thereby the upper edges of said plate being beveled and a series of rollers secured to the upper edges of said armor-plate and having their peripheries lying close to and extending above said beveled portions, substantially as described.

8. In a war-car, the combination with the main frame, of a surrounding casing of armor-plate supported thereby and provided with a horizontal slit, a bracket secured to said plate on the inside in line with said slit, and a flat step-plate extending through said slit provided outside of said plate with a depending lip, and on the inside with means for detachably engaging said bracket, substantially as described.

9. In a war-car, the combination with the main frame, and its supporting-wheels, of a surrounding casing of armor-plate, springs interposed between said casing and said frame to support the weight of said casing, horizontal links pivotally connected to said main frame and to the casing for holding it in respect to the main frame, while permitting it to rise and fall, a motor operatively connected to said wheels, revolving turrets supported by said main frame, mechanism for operating said turrets from within the same, a steering mechanism, a vertically-adjustable rod, a mirror carried thereby, and a stationary mirror adjacent to said steering mechanism, substantially as described.

FREDERICK RICHARD SIMMS.

Witnesses:
H. M. SCOTT,
ARTHUR G. HEMING.